Dec. 30, 1958 R. J. WRIGHTON 2,866,355
CABLE TENSION REGULATOR
Filed Feb. 27, 1957
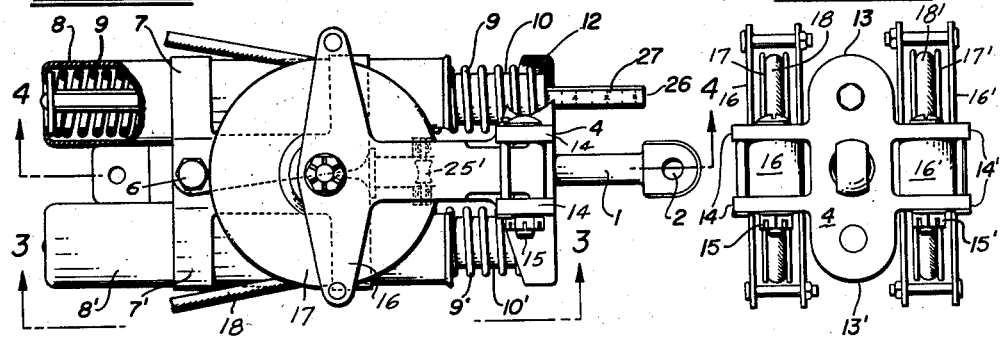
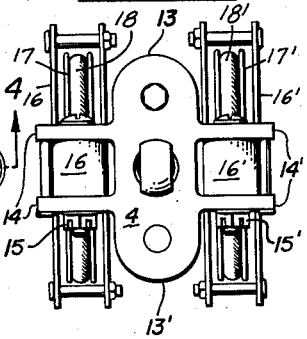
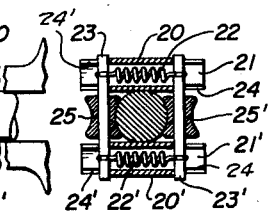
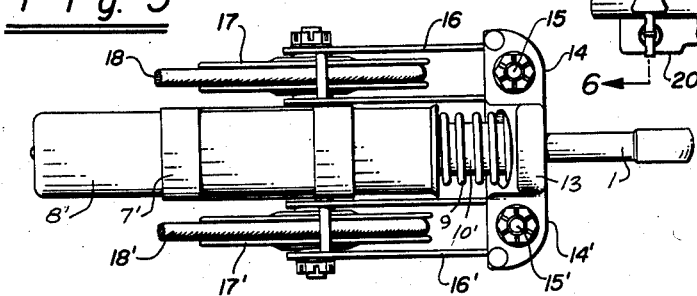
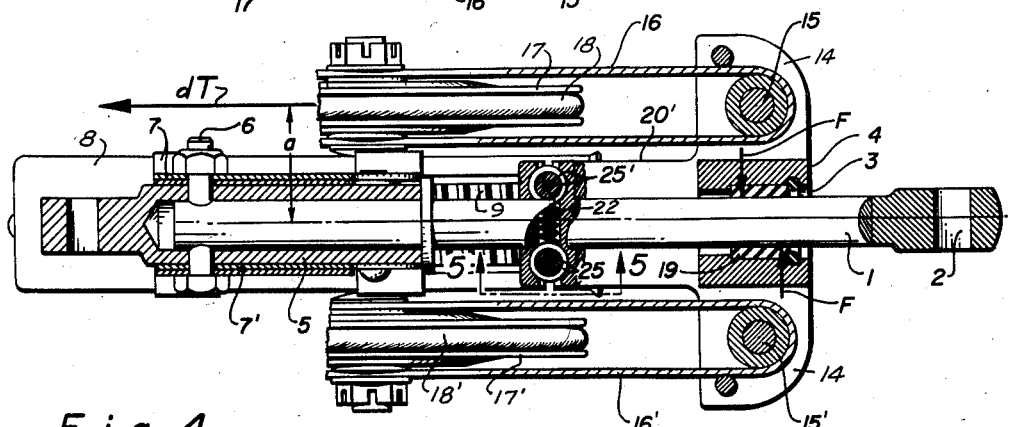
INVENTOR.
Robert J. Wrighton
BY
Paul B. Hunter
Attorney United States Patent Office 2,866,355
Patented Dec. 30, 1958

2,866,355

CABLE TENSION REGULATOR

Robert J. Wrighton, Tarzana, Calif., assignor to Pacific Scientific Aeroproducts, Glendale, Calif., a corporation of California Application February 27, 1957, Serial No. 642,714

7 Claims. (Cl. 74—501.5)

This invention relates, generally, to cable tension regulators, and the invention has reference, more particularly, to a novel cable tension regulator adapted for use in connection with the control cables of aircraft as for operating engine throttles, the control surfaces such as ailerons, elevators, and rudders, and prop feathering mechanisms, etc., the said cable tension regulator being designed to prevent the regulator from locking in those cases where the cable system is such that one side of the system, or one cable, may be loaded higher than the other side as in an aileron control system where, due to aerodynamic lift, there is normally lift on the surface and greater tension in one cable than in the other, or as in a prop feathering control system for example, where, to ensure that the prop does not creep into the feathered position, one control cable or one side of the system is slightly loaded at all times.

Cable tension regulators generally have spring means intended to keep the rig tension on the cables constant and substantially equal when the control cables are not being operated, in order to compensate for temperature changes resulting in differences of expansion of the cable and airframe. Also, these regulators prevent the cables from becoming slack or excessively taut under various conditions of use, such as flexure of the aircraft structure where the cable run does not coincide with the neutral axis of the surrounding airframe. This flexure may result from shifting weights in the aircraft or where the load is transferred from the landing gear to the wings of the aircraft when the plane becomes airborne, rough air conditions, etc. Thus, such cables are at all times quite long and their coefficients of expansion and contraction may be quite different from that of the airframe itself, resulting in considerable slack being encountered in the cables, as when the plane is flying at great height with low outside temperatures, thus making the controls "mushy" if a regulator is not provided for correcting such expansions and contractions resulting from temperature and other changes including deflections of the airframe.

These cable tension regulators, as heretofore constructed, are generally equipped with a mechanism which will operate as a brake or lock to prevent the regulator from compensating when unsymmetrical or control loads are applied. If the regulator were to compensate during the application of control loads, i. e., if the regulator would permit the cables to change in length during a control operation, such a control system would feel mushy and would actually result in reducing the amount of controlled member or surface movement relative to the movement of the controls in the cockpit. These cable tension regulator locks or brakes, however, have to be designed so that, when variable symmetrical loads are applied to the regulator, such as would occur resulting from temperature variations or structural deflections of the aircraft, for example, the regulator lock or brake will not operate and will allow the regulator to compensate freely for such variations in tension. Cable tension regulators, however, as heretofore constructed, require that the cable loadings on each side of the system, i. e., on each side of the regulator, be substantially equal in order to allow for compensation, i. e., allow for expansion and contraction of the cables, to maintain constant tension therein during temperature changes, airframe flexure, etc., and if the loadings on both sides of the system are not equal the regulator would ordinarily lock.

However, there are instances where it is desired to maintain a differential tension on the cables on opposite sides of the regulator, and yet permit regulation by the regulator without the locking thereof. Thus, some closed cable systems operate continuously with one cable loaded higher than the other for long periods of time, and an ordinary regulator under such conditions would tend to lock and prevent compensation.

The principal object of the present invention is to provide a novel cable tension regulator that is adapted to permit regulation or compensation even though one side of the system, or one cable, is loaded higher than the other in normal operation or for long periods of time, as where one cable is loaded somewhat higher than the other, such as in an aileron control system, or to prevent feathering of a propeller.

Another object of the present invention is to provide a novel cable tension regulator of the above character that will permit compensation of the cable system without locking thereof, even though one side of the system is under greater tension than the other, said regulator employing means for preventing the locking of the regulator until a predetermined differential loading of the two sides of the system exists, any increase in said differential loading causing said means to operate to effect the locking of the regulator.

A feature of the present invention is to provide a novel cable tension regulator of the above character that employs relatively simple and dependable spring loaded rollers contacting the locking shaft for preventing the locking of the shaft upon the regulator crosshead until a desired differential loading is exceeded.

These and other objects and advantages of the present invention will become more apparent from a perusal of the following specification taken in connection with the accompanying drawings wherein:

Fig. 1 is a side view of the novel cable tension regulator of the present invention, with parts broken away;

Fig. 2 is an end view of the structure shown in Fig. 1;

Fig. 3 is a plan view of the structure shown in Fig. 1 taken along line 3—3 of Fig. 1;

Fig. 4 is an enlarged part-sectional view, with parts broken away, taken along the lines 4—4 of Fig. 1;

Fig. 5 is an enlarged fragmentary view of a portion of the structure of Fig. 1 taken along the line 5—5 of Fig. 4; and Fig. 6 is a sectional view taken along the lines 6—6 of Fig. 5.

Similar characters of reference are used in the above figures to designate corresponding parts.

Referring now to the drawings, the reference numeral 1 designates a regulator lock shaft having an eye 2 in the free end thereof for attachment of the regulator to a convenient point within the aircraft. Lock shaft 1 extends through an aperture 3 within the crosshead 4 (see Fig. 4) and from thence this shaft extends interiorly of the regulator and into the hollow rectangular body 5 thereof wherein its inner end is retained within the body as by a bolt 6 extending transversely through the body and the lock shaft. The bolt 6 also serves to secure guide tube clamps 7 and 7' to the body 5 at opposite sides thereof, which clamps carry hollow outer guide tubes 8 and 8' respectively. Coil compression springs 9 and 9' are contained within the outer guide tubes 8 and 8' and also surround inner guide tubes 10 and 10' which are adapted to telescope into outer guide tubes 8 and 8' in use, as springs 9 and 9' compress and expand. Compression springs 9 and 9' are compressed between the outer ends of tubes 8 and 8' and seats 12 provided in opposite end portions 13 and 13' of the crosshead 4. The crosshead 4 is provided with pairs of outwardly projecting spaced lugs 14 and 14' extending at right angles to the plane of end portions 13 and 13', as shown in Fig. 2, which lugs carry bolts 15 and 15' supporting pulley yokes 16 and 16', which, in turn, carry pulleys 17 and 17'. Pulley 17 carries cable 18 connected to one side of the cable control system, and pulley 17' carries cable 18' connected to the other side of the cable control system.

The aperture 3 of the crosshead 4 has a braking or locking collar 19 retained therewithin, which collar 19 has a sliding fit on the lock shaft 1. The crosshead 4 is provided with inward extensions 20 and 20, extending along opposite sides of the lock shaft 1 (see especially Figs. 4, 5, and 6), which extensions are provided with transverse bores 21 and 21'. Extending axially within these bores are tension springs 22 and 22', the ends of which tension springs engage transverse pins 23 and 23' and serve normally to retain these pins in the bottoms of pockets or recesses 24 and 24' provided in the extensions 20 and 20'. The pins 23 and 23' carry rollers 25 and 25' having concave surfaces for cooperating with the lock shaft 1. With the pins 23 and 23' engaging the bottoms of their pockets under the action of tension springs 22 and 22', the rollers 25 and 25' touch lightly against the opposite sides of the lock shaft 1, or may have a slight clearance with respect to the shaft depending on the depth of stop notches 24 and 24', thus permitting normal longitudinal movement of the shaft past these rollers in use.

In operation, assuming that the control cables 18 and 18' carry equal tensions, any shortening or lengthening of these cables in use due, for example, to thermal changes or to airframe flexure, will cause the cable sheaves 17 and 17', acting through yokes 16 and 16', to vary the force exerted by crosshead 4 upon springs 9 and 9', so that these springs are caused to flex either by compressing or expanding so as to retain the tension in cables 18 and 18' substantially constant, thereby compensating for such changes in temperature or structural deflections without locking the regulator. If now, one of the cables 18, for example, should have its tension increased over that of cable 18' such that an increment of tension $dT$ (see Fig. 4) is applied to cable 18 over the tension applied to cable 18', then this increment of tension or force acting through yoke 16, produces a couple tending to turn the crosshead 4 with respect to lock shaft 1. However, in the absence of springs 22 and 22' and rollers 25 and 25', this couple would set up a force moment, shown by arrows F, about the braking collar 19 with respect to lock shaft 1, acting to cause this braking collar to bind upon the lock shaft and prevent longitudinal compensating movements of this lock shaft. While this locking action would be desirable in systems wherein cables 18 and 18' are equally loaded in normal use, in those systems where these cables are not equally loaded, it is not desirable to have the braking collar 19 lock upon shaft 1 until the normal differential in tension of cables 18 and 18' has been exceeded, due to a control movement of the system. To prevent the turning of the crosshead 4 and consequent locking of the collar 19 upon the shaft 1, the springs 22 and 22' and rollers 25 and 25' function to prevent such locking movement from taking place until the allowable differential in tension between the sides of the cable control system has been exceeded. This will be apparent when it is observed that, as the crosshead 4 tends to turn counter-clockwise (as viewed in Fig. 4) using the bearing of braking collar 19 upon lock shaft 1 as a pivot, due to the increment of tension $dT$ the free ends of extensions 20 and 20' of the crosshead tend to move downwardly, as shown in Fig. 4, but this downward motion is resisted by tension springs 22 and 22', which, by pulling upon upper roller 25' resting on shaft 1, prevent downward movement of the extensions 20 and 20' until the tension of these springs is exceeded. The tension of these springs is set initially to a value necessary to obtain the allowable differential in tension normally obtaining between the two sides of the system. Looked at in a different way, the springs 22 and 22' and rollers 25 and 25' resist the turning movement of crosshead 4 about lock shaft 1, and hence resist the locking of the braking collar 19 upon the shaft 1 until the desired allowable differential in tension permitted between cables 18 and 18', as represented by the setting of springs 22 and 22', is exceeded. Once this allowable differential in tension is exceeded, the springs 22 and 22' will yield, permitting the instantaneous turning of the crosshead and locking of the collar 19 upon the shaft 1, so that compensating action of the regulator immediately ceases during a control operation, whereby the controls are prevented from becoming mushy or sloppy, which would otherwise occur if compensation were permitted at this time.

Similarly, if cable 18' were normally to have a higher tension than cable 18, the regulator would not lock until after the predetermined tension of springs 22 and 22' had been exceeded, so that it will be seen that this type of regulator will allow compensating movements of the regulator, even though the two sides of the control system normally have different tensions, until such time as a control force is applied to the system, whereupon the tensions of springs 22 and 22' are exceeded and the device locks to effect the desired control operation.

A shaft 26 has its inner end affixed to the end of outer guide tube 8 and extends within this tube and within the spring 9 and outwardly through the end of crosshead 4, whereat it is provided with a scale 27, which, when read against the crosshead, indicates at any time the position of compensation travel of the regulator.

Since many changes could be made in the above construction of the cable tension regulator and many apparently widely different embodiments of this invention could be made without departing from the scope thereof, it is intended that all matter contained in the description or shown in the accompanying drawings shall be interpreted as illustrative and not in a limiting sense.

What is claimed is:

1. A cable tension regulator comprising a lock shaft, a crosshead provided with a braking collar slidable along said lock shaft, control cables connected to said crosshead, spring means acting between said lock shaft and said crosshead for tensioning said cables while permitting compensating action thereof, the tilting of said crosshead upon said lock shaft due to unequal tensions in said control cables tending to cause locking of said crosshead braking collar upon said lock shaft to prevent further compensation of said regulator, said crosshead having means thereon for engaging said lock shaft at a point removed from said braking collar to prevent the locking thereof until the difference in tensions of said control cables exceeds a predetermined value.

2. A cable tension regulator as defined in claim 1, wherein said crosshead means for preventing locking of said regulator comprises means engaging opposite sides of said lock shaft and additional spring means acting between said engaging means and said crosshead preventing turning of said crosshead until the tension of said additional spring means has been exceeded.

3. In a cable tension regulator of the character described, a lock shaft, a crosshead having a braking collar movable along said lock shaft, said crosshead carrying the cables of a control system on opposite sides of said lock shaft, whereby a difference in tensions of said cables tends to produce a turning of the crosshead braking collar with respect to said lock shaft and effect the locking of said crosshead upon said lock shaft, said crosshead carrying spring pressed members for engaging opposite sides of said lock shaft at a point removed from said braking collar to prevent the turning of said crosshead until said spring pressed members have been overcome, whereby said cables of the control system are allowed to operate normally at a differential tension and locking is not effected until after this differential tension is exceeded.

4. A cable tension regulator as defined in claim 3, wherein said spring pressed members comprise rollers for engaging opposite sides of said lock shaft and springs connected to urge said rollers toward each other and toward said shaft.

5. A cable tension regulator as defined in claim 4, wherein said crosshead has stop means for limiting the movement of said rollers under the action of said springs.

6. A cable tension regulator as defined in claim 5, wherein said stop means comprises notches in said crosshead, said rollers having shafts engaging in said notches, said springs acting to pull said shafts toward each other for normally engaging the bottoms of said notches, said shafts moving away from the bottoms of said notches only when the load of the springs is overcome.

7. A cable tension regulator comprising a lock shaft, a crosshead having a lock collar slidable along said lock shaft during compensation action of said regulator, sheaves carried by said crosshead on opposite sides of said lock shaft, said sheaves being adapted to be connected respectively to the cables of the opposite sides of a control system, compression springs carried by said lock shaft and acting upon said crosshead for tensioning said cables while permitting compensation action thereof through movement of said sheaves with respect to said lock shaft, said crosshead lock collar serving for locking upon said lock shaft to prevent said compensation action upon a control movement of the regulator cables, said crosshead having extensions carrying spring pressed rollers for engaging opposite sides of said lock shaft removed from said lock collar to prevent the locking of said lock collar upon said lock shaft until the tensions of the cables on opposite sides of said control system differ by a predetermined amount determined by the present tension of said spring pressed rollers.

References Cited in the file of this patent
UNITED STATES PATENTS

| | | |
|---|---|---|
| 2,363,228 | Cade | Nov. 21, 1944 |
| 2,581,080 | Cushman | Jan. 1, 1952 |
| 2,585,358 | Weber | Feb. 12, 1952 |
| 2,591,011 | Rose et al. | Apr. 1, 1952 |
| 2,841,030 | Wrighton | July 1, 1958 |